(12) United States Patent
Panusopone et al.

(10) Patent No.: US 9,749,650 B2
(45) Date of Patent: Aug. 29, 2017

(54) SCALABLE MOTION ESTIMATION WITH MACROBLOCK PARTITIONS OF DIFFERENT SHAPES AND SIZES

(71) Applicant: General Instrument Corporation, Horsham, PA (US)

(72) Inventors: Krit Panusopone, San Diego, CA (US); Limin Wang, San Diego, CA (US); Yinqing Zhao, San Diego, CA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 479 days.

(21) Appl. No.: 13/749,545

(22) Filed: Jan. 24, 2013

(65) Prior Publication Data

US 2013/0142261 A1 Jun. 6, 2013

Related U.S. Application Data

(63) Continuation of application No. 12/238,538, filed on Sep. 26, 2008, now Pat. No. 8,379,727.

(51) Int. Cl.

| H04N 19/00 | (2014.01) |
| H04N 19/51 | (2014.01) |
| H04N 19/61 | (2014.01) |
| H04N 19/533 | (2014.01) |
| H04N 19/57 | (2014.01) |

(52) U.S. Cl.
CPC ........... H04N 19/51 (2014.11); H04N 19/533 (2014.11); H04N 19/57 (2014.11); H04N 19/61 (2014.11)

(58) Field of Classification Search
CPC .............. B29C 45/14631; B29C 70/48; B29K 2105/08; H04N 19/00733; H04N 19/51; H04N 19/533; H04N 19/57; H04N 19/61; H04N 7/50; H04N 7/26244; H04N 5/145; H04N 7/26765; H04N 7/26015
USPC ...................................................... 375/240.16
See application file for complete search history.

(56) References Cited

U.S. PATENT DOCUMENTS

| 5,157,742 | A | * | 10/1992 | Niihara | .................... | 382/236 |
| 5,646,618 | A | * | 7/1997 | Walsh | .................. | H03M 7/425 |
| | | | | | | 341/106 |
| 5,646,648 | A | * | 7/1997 | Bertram | ................ | G06F 3/0219 |
| | | | | | | 341/22 |
| 5,812,788 | A | * | 9/1998 | Agarwal | ............ | H04N 21/4143 |
| | | | | | | 375/240.03 |
| 5,883,674 | A | * | 3/1999 | Ogura | ..................... | 375/240.15 |

(Continued)

OTHER PUBLICATIONS

Peixoto et al, An H.264/AVC to HEVC video transcoder based on mode mapping, 2013.*

(Continued)

*Primary Examiner* — Shan Elahi
(74) *Attorney, Agent, or Firm* — Thomas A. Ward

(57) ABSTRACT

Scalable motion estimation is provided for macroblocks of a picture with the macroblocks being subdividable into partitions of different shapes and sizes. One embodiment of a method for performing motion estimation includes setting a target complexity for a macroblock of a source frame and performing motion estimation for one or more partitions of the macroblock until the target complexity is met. The macroblock partitions can be rectangular, square or a combination of rectangular and square.

7 Claims, 4 Drawing Sheets

(56) References Cited

U.S. PATENT DOCUMENTS

| | | | |
|---|---|---|---|
| 5,959,672 A * | 9/1999 | Sasaki | H04N 19/503 375/240.14 |
| 6,219,103 B1 * | 4/2001 | Sugiyama | 348/452 |
| 7,616,692 B2 * | 11/2009 | Holcomb et al. | 375/240.16 |
| 7,630,438 B2 * | 12/2009 | Mukerjee et al. | 375/240.16 |
| 8,064,520 B2 * | 11/2011 | Mukerjee et al. | 375/240.15 |
| 8,509,316 B2 * | 8/2013 | Rusanovskyy | H04N 7/12 375/240.29 |
| 2002/0159526 A1 * | 10/2002 | Hekstra | G06T 9/20 375/240.15 |
| 2003/0021344 A1 | 1/2003 | Panusopone et al. | |
| 2004/0057517 A1 * | 3/2004 | Wells | H04N 5/21 375/240.16 |
| 2004/0114688 A1 * | 6/2004 | Kang | H04N 19/53 375/240.12 |
| 2004/0252760 A1 * | 12/2004 | Winger | H04N 19/105 375/240.12 |
| 2005/0013376 A1 * | 1/2005 | Dattani et al. | 375/240.24 |
| 2005/0036551 A1 * | 2/2005 | Winger et al. | 375/240.16 |
| 2005/0063465 A1 * | 3/2005 | Cote | H04N 19/51 375/240.12 |
| 2005/0105618 A1 * | 5/2005 | Booth et al. | 375/240.16 |
| 2005/0129122 A1 * | 6/2005 | Booth et al. | 375/240.16 |
| 2005/0207495 A1 * | 9/2005 | Ramasastry et al. | 375/240.16 |
| 2005/0207664 A1 * | 9/2005 | Ramasastry et al. | 382/240 |
| 2006/0153300 A1 * | 7/2006 | Wang | H04N 19/56 375/240.16 |
| 2006/0193388 A1 * | 8/2006 | Woods | H04N 19/647 375/240.16 |
| 2006/0209959 A1 * | 9/2006 | Sun | H04N 19/56 375/240.16 |
| 2006/0222074 A1 * | 10/2006 | Zhang | H04N 19/176 375/240.16 |
| 2007/0064803 A1 | 3/2007 | Miao et al. | |
| 2007/0237221 A1 * | 10/2007 | Hsu et al. | 375/240.03 |
| 2007/0237237 A1 * | 10/2007 | Chang et al. | 375/240.21 |
| 2007/0248163 A1 * | 10/2007 | Zuo et al. | 375/240.2 |
| 2008/0107185 A1 * | 5/2008 | Lefol | H04N 19/176 375/240.25 |
| 2008/0111721 A1 * | 5/2008 | Reznik | 341/67 |
| 2008/0152000 A1 * | 6/2008 | Kaushik | H04N 19/197 375/240.03 |
| 2008/0205526 A1 * | 8/2008 | Kang | H04N 19/53 375/240.16 |
| 2008/0212678 A1 * | 9/2008 | Booth et al. | 375/240.16 |
| 2008/0224905 A1 * | 9/2008 | Reznik | 341/67 |
| 2008/0260023 A1 * | 10/2008 | Sung | H04N 19/428 375/240.03 |
| 2010/0061459 A1 * | 3/2010 | Panusopone | H04N 19/51 375/240.16 |
| 2010/0086032 A1 * | 4/2010 | Chen et al. | 375/240.12 |
| 2013/0034170 A1 * | 2/2013 | Chen et al. | 375/240.25 |
| 2013/0230099 A1 * | 9/2013 | DeForest et al. | 375/240.08 |
| 2013/0266077 A1 * | 10/2013 | Boyce | H04N 19/70 375/240.25 |
| 2014/0301460 A1 * | 10/2014 | Karczewicz | H04N 19/147 375/240.12 |

OTHER PUBLICATIONS

Shang et al, Efficient global motion estimation using macroblock pair vectors, 2009.*

Hung et al, On macroblock partition for motion compensation, 2006.*

* cited by examiner

SCALABLE MOTION ESTIMATION WITH MACROBLOCK PARTITIONS OF DIFFERENT SHAPES AND SIZES

CROSS REFERENCE TO RELATED APPLICATION

This application is a continuation of U.S. patent application Ser. No. 12/238,538, filed Sep. 26, 2008, which is incorporated herein by reference in its entirety.

FIELD OF THE INVENTION

The present invention generally relates to video encoding, and more particularly relates to motion estimation.

BACKGROUND OF THE INVENTION

Motion estimation is the biggest bottleneck in terms of computational load for many conventional video encoders, because it requires processing over multiple estimated frames and multiple partition types. Numerous fast motion estimation techniques have been proposed to speed up video encoder processes. A majority of these techniques skip most search candidates that are considered unlikely to be the best match in order to reduce the overall complexity of the motion estimation technique.

Unlike full search techniques, where a search window dictates the required search operations, fast motion estimation techniques typically require a different level of complexity for different inputs. This requirement makes fast motion estimation techniques difficult to implement in hardware where timing requirements are stringent. This difficulty is exacerbated in encoders such as the known H.264 encoder, where the fast motion estimation must be performed repeatedly for every partition type and reference picture combination (which results in a larger variation of complexity from macroblock to macroblock).

Therefore, there is a need in the art for a scalable method and apparatus for fast motion estimation that efficiently speeds up the video encoding process.

SUMMARY OF THE INVENTION

Embodiments of the invention generally provide a method and apparatus for scalable motion estimation. One embodiment of a method for performing motion estimation includes setting a target complexity for a macroblock of a source frame and performing motion estimation for one or more partitions of the macroblock until the target complexity is met.

In another embodiment, a computer readable medium contains an executable program for performing motion estimation, where the program sets a target complexity for a macroblock of a source frame and performs motion estimation for one or more partitions of the macroblock until the target complexity is met.

In another embodiment, a video encoder includes an input for receiving a source frame of video, a motion estimator for setting a target complexity for a macroblock of the source frame and for performing motion estimation for one or more partitions of the macroblock until the target complexity is met, and an output for outputting the source frame in a coded form.

In another embodiment a method for performing motion estimation includes setting a target complexity for a macroblock of a source frame and performing motion estimation for one or more partitions of the macroblock, where performing motion estimation includes performing motion estimation for a first square-shaped partition of the macroblock and for a first number of reference pictures; performing motion estimation for a second square-shaped partition of the macroblock that is smaller in size than the first square-shaped partition and for the first number of reference pictures; performing motion estimation for the first square-shaped partition and for a second number of reference pictures; performing motion estimation for the second square-shaped partition and for the second number of reference pictures; performing motion estimation for a first rectangular-shaped partition of the macroblock and for the first number of reference pictures; performing motion estimation for a second rectangular-shaped partition of the macroblock and for the first number of reference pictures; performing motion estimation for the first rectangular-shaped partition and for the first number of reference pictures; and performing motion estimation for the second rectangular-shaped partition and for the first number of reference pictures, wherein the motion estimation is terminated when the target complexity is met.

BRIEF DESCRIPTION OF THE DRAWINGS

So that the manner in which the above recited embodiments of the invention are attained and can be understood in detail, a more particular description of the invention may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Embodiments of the invention provide a scalable approach to motion estimation in which various steps of the motion estimation process correspond to different complexities and search qualities. In one embodiment, complexity is controlled at the partition type and reference frame level. Although embodiments of the invention are discussed in connection with a simplified hexagon search algorithm, those of skill in the art will appreciate that the present invention may be advantageously applied in connection with any kind of motion estimation search algorithm.

Figure 1:
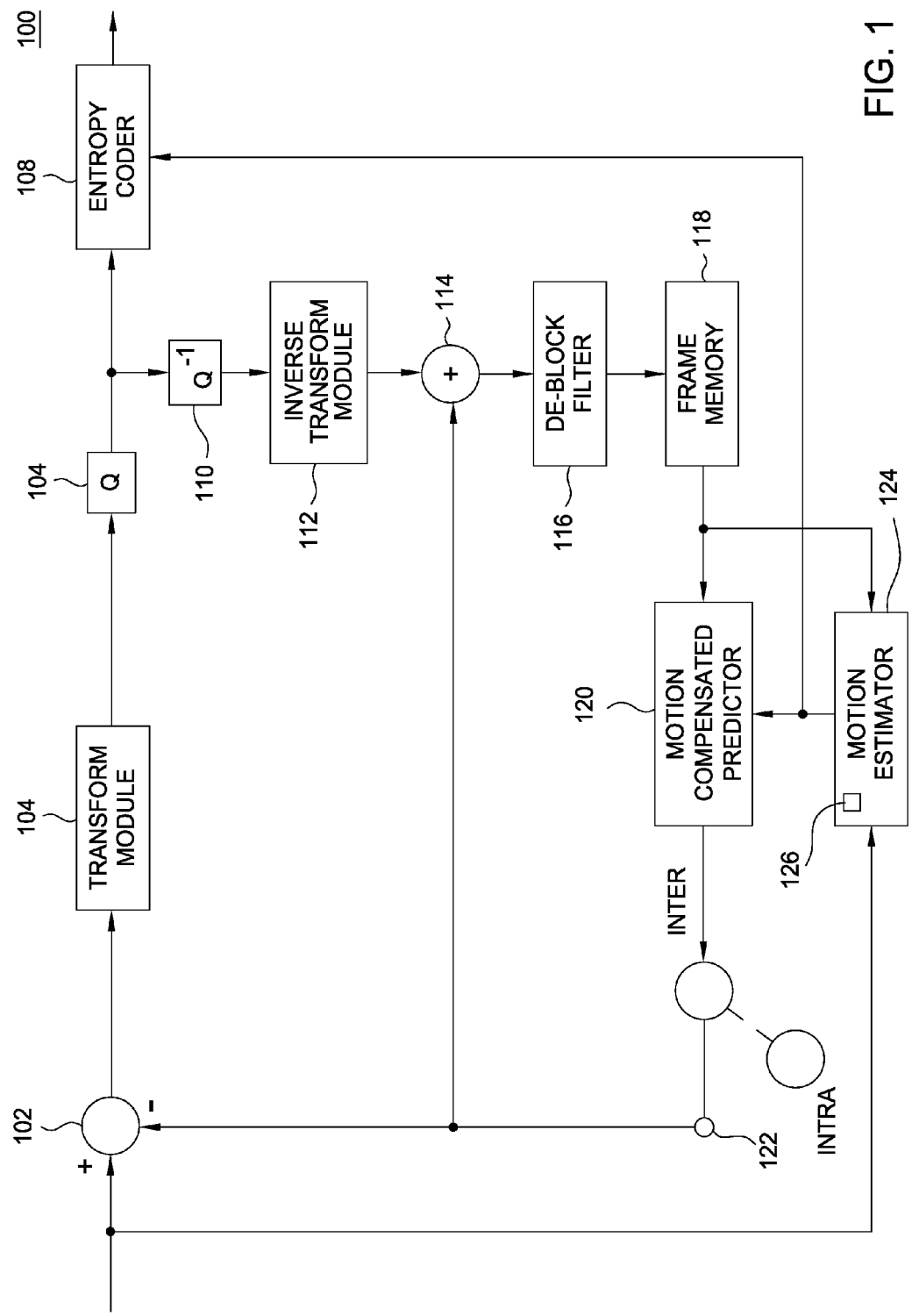
FIG. 1 is a block diagram depicting an exemplary embodiment of a video encoder.

FIG. 1 is a block diagram depicting an exemplary embodiment of a video encoder 100. Since FIG. 1 is intended to only provide an illustrative example of a H.264 encoder, FIG. 1 should not be interpreted as limiting the present invention. For example, the video encoder 100 is compliant with the H.264 standard or the Advanced Video Coding (AVC) standard. The video encoder 100 may include a subtractor 102, a transform module, e.g., a discrete cosine transform (DCT) like module 104, a quantizer 106, an entropy coder 108, an inverse quantizer 110, an inverse transform module, e.g., an inverse DCT like module 112, a summer 114, a deblocking filter 116, a frame memory 118, a motion compensated predictor 120, an intra/inter switch 122, and a motion estimator 124. It should be noted that although the modules of the encoder 100 are illustrated as separate modules, the present invention is not so limited. In other words, various functions (e.g., transformation and quantization) performed by these modules can be combined into a single module.

In operation, the video encoder 100 receives an input sequence of source frames. The subtractor 102 receives a source frame from the input sequence and a predicted frame from the intra/inter switch 122. The subtractor 102 computes a difference between the source frame and the predicted frame, which is provided to the DCT module 104. In INTER mode, the predicted frame is generated by the motion compensated predictor 120. In INTRA mode, the predicted frame is zero and thus the output of the subtractor 102 is the source frame.

The DCT module 104 transforms the difference signal from the pixel domain to the frequency domain using a DCT algorithm to produce a set of coefficients. The quantizer 106 quantizes the DCT coefficients. The entropy coder 108 codes the quantized DCT coefficients to produce a coded frame.

The inverse quantizer 110 performs the inverse operation of the quantizer 106 to recover the DCT coefficients. The inverse DCT module 112 performs the inverse operation of the DCT module 104 to produce an estimated difference signal. The estimated difference signal is added to the predicted frame by the summer 114 to produce an estimated or frame, which is coupled to the deblocking filter 116. The deblocking filter deblocks the estimated frame and stores the estimated frame or reference frame in the frame memory 118. The motion compensated predictor 120 and the motion estimator 124 are coupled to the frame memory 118 and are configured to obtain one or more previously estimated frames (previously coded frames).

The motion estimator 124 also receives the source frame. The motion estimator 124 performs a motion estimation algorithm using the source frame and a previous estimated frame (i.e., reference frame) to produce motion estimation data. For example, the motion estimation data includes motion vectors and minimum sums of absolute differences (SADs) for the macroblocks of the source frame. The motion estimation data is provided to the entropy coder 108 and the motion compensated predictor 120. The entropy coder 108 codes the motion estimation data to produce coded motion data. The motion compensated predictor 120 performs a motion compensation algorithm using a previous estimated frame and the motion estimation data to produce the predicted frame, which is coupled to the intra/inter switch 122. Motion estimation and motion compensation algorithms are well known in the art.

To illustrate, the motion estimator 124 may include mode decision logic 126. The mode decision logic 126 can be configured to select a mode for each macroblock in a predictive (INTER) frame. The "mode" of a macroblock is the partitioning scheme. That is, the mode decision logic 126 selects MODE for each macroblock in a predictive frame, which is defined by values for MB_TYPE and SUB_MB_TYPE.

The above description only provides a brief view of the various complex algorithms that must be executed to provide the encoded bitstreams generated by an H.264 encoder.

Embodiments of the invention provide a scalable approach to motion estimation in which various steps of the motion estimation process correspond to different complexities and search qualities. In one embodiment, complexity is controlled at the partition type and reference frame level.

Figure 2A:
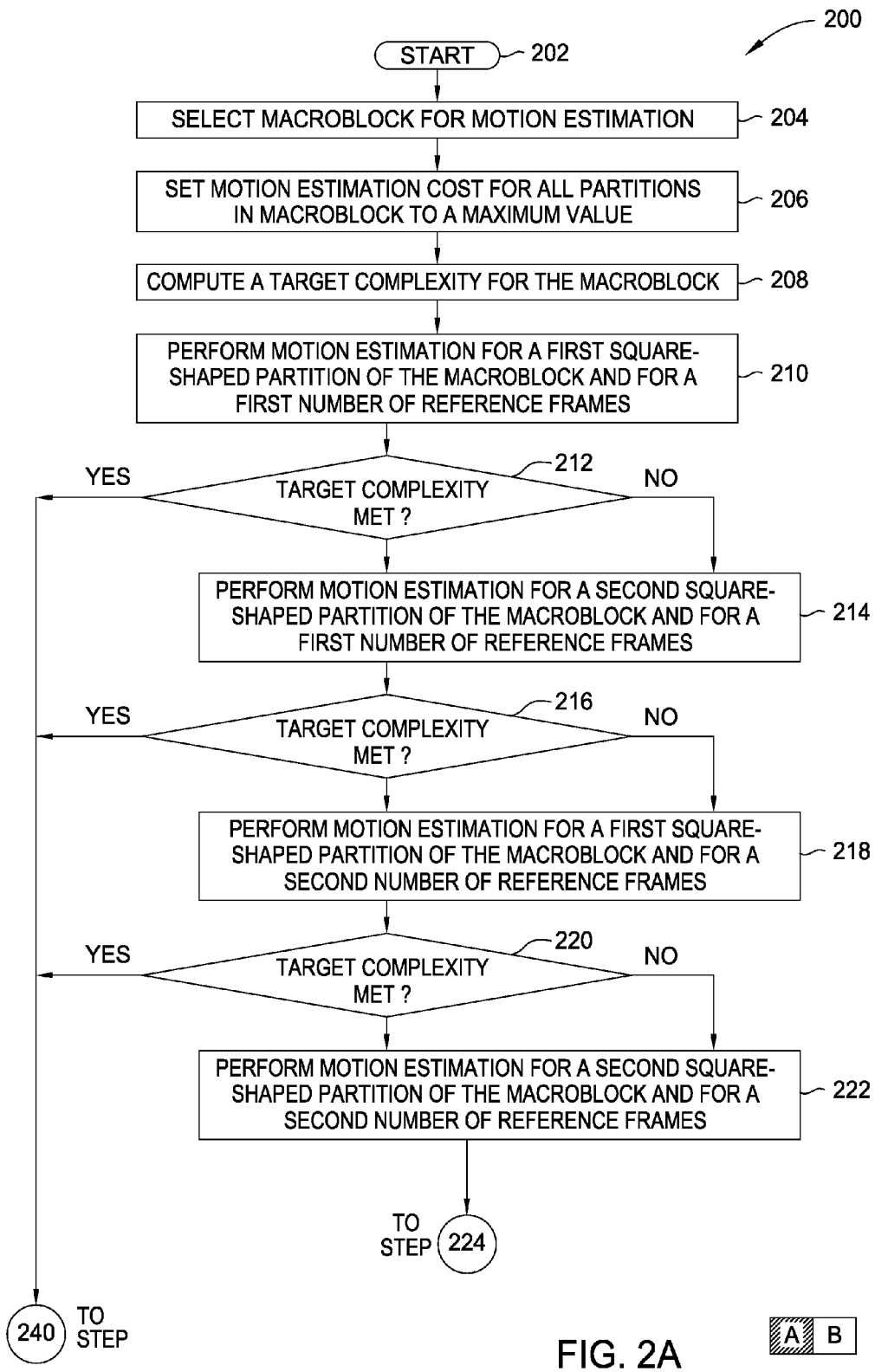
FIGS. 2A-2B present a flow diagram illustrating one embodiment of a method for performing motion estimation for a macroblock of a source frame, according to the present invention.
Figure 2B:
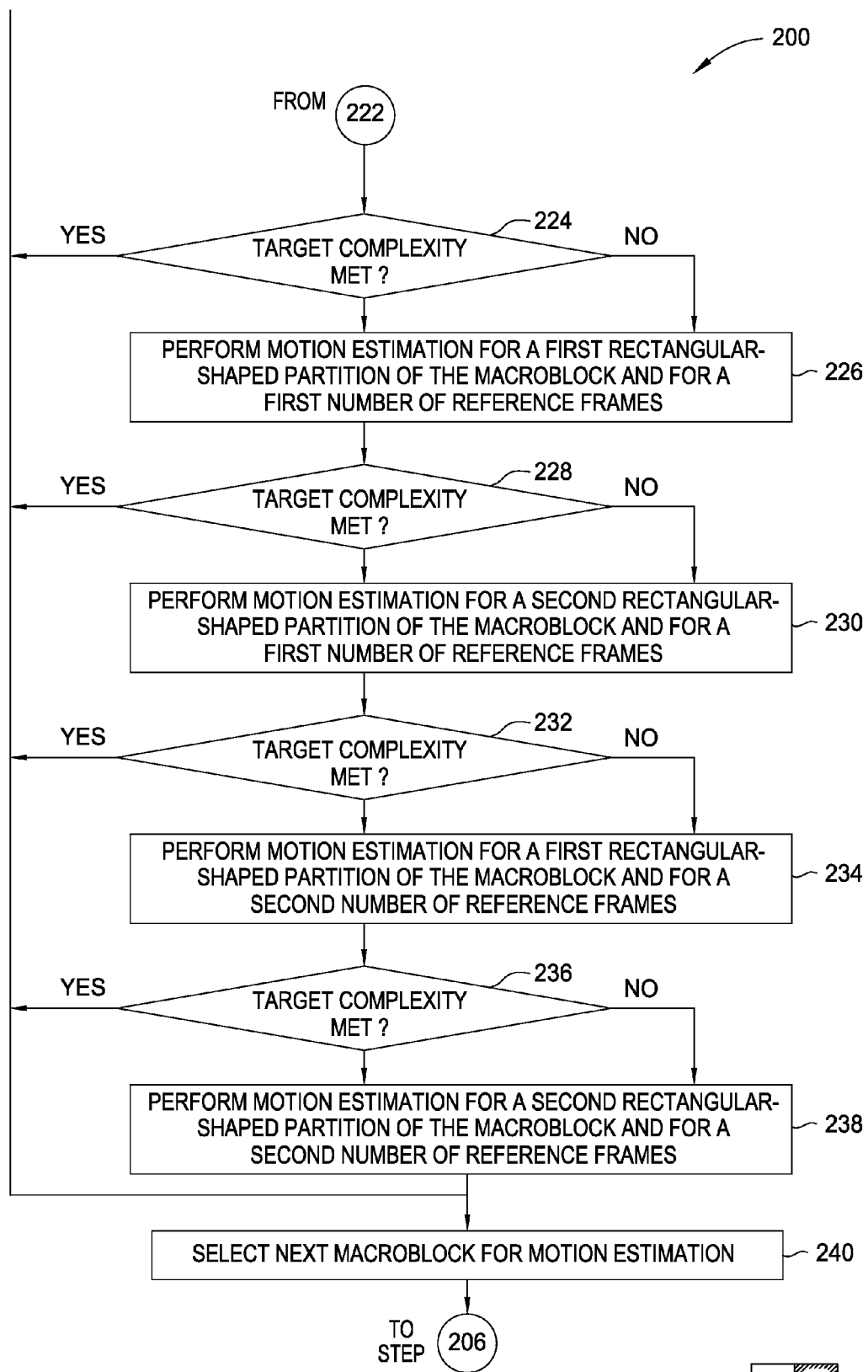
Figure 2B:

FIGS. 2A-2B present a flow diagram illustrating one embodiment of a method 200 for performing motion estimation for a macroblock of a source frame, according to the present invention. The method 200 may be implemented, for example, at the motion estimator 124 of FIG. 1.

The method 200 is initialized at step 202, and proceeds to step 204, where the motion estimator selects the source macroblock for which the motion estimation is to be performed. In step 206, the motion estimator sets a motion estimation cost for all partitions of the source macroblock to a maximum possible value. For example, the maximum possible value can be the highest possible value allowed by the particular hardware and/or software implementations of the motion estimator.

In step 208, the motion estimator computes a target complexity for the source macroblock. The target complexity represents a "budget" or maximum number of searches that may be performed for the source macroblock. In one embodiment the target complexity is derived from a metric based on an SAD count (i.e., how many SAD computations can be performed).

In step 210, the motion estimator performs motion estimation for a first square-shaped partition of the source macroblock and using a number, x, of reference frames for predictive pictures or a number, y, of reference frames for bi-predictive pictures. For a predictive picture, x is one or more reference frames; for a bi-predictive picture, y is two or more reference frames. For example, the method 200 may start out by using 1 reference frame for a predictive picture, or two reference frames for a bi-predictive picture. In one embodiment, the first square-shaped partition is a 16×16 partition. In one embodiment, the motion estimation is performed in accordance with a simplified hexagon search, although other search algorithms may be used.

In step 212, the motion estimator determines whether the motion estimation performed in step 210 has caused the target complexity to be met (e.g., whether the maximum number of searches has been performed). If the motion estimator concludes in step 212 that the target complexity has been met, the motion estimator proceeds to step 240 and selects a next source macroblock for motion estimation (i.e., motion estimation for the current source macroblock is terminated).

Alternatively, if the motion estimator concludes in step 212 that the target complexity has not been met, the motion estimator proceeds to step 214 and performs motion estimation for a second square-shaped partition of the source macroblock, again using x reference frames for predictive pictures or y reference frames for bi-predictive pictures, where x and y have the values discussed previously. In one embodiment, the second square-shaped partition is smaller in size than the first square-shaped partition, such that motion estimation is performed square-shaped partitions in order of decreasing size. In a further embodiment, the second square-shaped partition is an 8×8 partition. In one embodiment, the motion estimation is performed in accordance with a simplified hexagon search, although other search algorithms may be used.

In step 216, the motion estimator determines whether the motion estimation performed in step 214 has caused the target complexity to be met (e.g., whether the maximum number of searches has been performed). If the motion estimator concludes in step 216 that the target complexity has been met, the motion estimator proceeds to step 240 and selects a next source macroblock for motion estimation (i.e., motion estimation for the current source macroblock is terminated).

Alternatively, if the motion estimator concludes in step 216 that the target complexity has not been met, the motion estimator proceeds to step 218 and performs motion estimation for the first square-shaped partition of the source macroblock using at least one additional reference frame. For instance, if 1 reference frame was used in step 210 for a predictive picture, at least two reference frames are used for the predictive picture in step 218. If two reference frames were used in step 210 for a bi-predictive picture, at least three reference frames are used for the bi-predictive picture in step 218. In one embodiment, the motion estimation is performed in accordance with a simplified hexagon search, although other search algorithms may be used.

In step 220, the motion estimator determines whether the motion estimation performed in step 218 has caused the target complexity to be met (e.g., whether the maximum number of searches has been performed). If the motion estimator concludes in step 220 that the target complexity has been met, the motion estimator proceeds to step 240 and selects a next source macroblock for motion estimation (i.e., motion estimation for the current source macroblock is terminated).

Alternatively, if the motion estimator concludes in step 220 that the target complexity has not been met, the motion estimator proceeds to step 222 and performs motion estimation for the second square-shaped partition of the source macroblock using at least one additional reference frame. For instance, if one reference frame was used for a predictive picture in step 214, at least two reference frames are used for the predictive picture in step 222. If two reference frames were used for a bi-predictive picture in step 214, at least three reference frames are used for the bi-predictive picture in step 222. In one embodiment, the motion estimation is performed in accordance with a simplified hexagon search, although other search algorithms may be used.

In step 224, the motion estimator determines whether the motion estimation performed in step 222 has caused the target complexity to be met (e.g., whether the maximum number of searches has been performed). If the motion estimator concludes in step 224 that the target complexity has been met, the motion estimator proceeds to step 240 and selects a next source macroblock for motion estimation (i.e., motion estimation for the current source macroblock is terminated).

Alternatively, if the motion estimator concludes in step 224 that the target complexity has not been met, the motion estimator proceeds to step 226 and performs motion estimation for a first rectangular-shaped partition of the source macroblock using a number, x, of reference frames for predictive pictures or a number, y, of reference frames for bi-predictive pictures, where x and y have the values discussed previously. In one embodiment, the first rectangular-shaped partition is a 16×8 partition. In one embodiment, the motion estimation is performed in accordance with a simplified hexagon search, although other search algorithms may be used.

In step 228, the motion estimator determines whether the motion estimation performed in step 226 has caused the target complexity to be met (e.g., whether the maximum number of searches has been performed). If the motion estimator concludes in step 228 that the target complexity has been met, the motion estimator proceeds to step 240 and selects a next source macroblock for motion estimation (i.e., motion estimation for the current source macroblock is terminated).

Alternatively, if the motion estimator concludes in step 228 that the target complexity has not been met, the motion estimator proceeds to step 230 and performs motion estimation for a second rectangular-shaped partition of the source macroblock using a number, x, of reference frames for predictive pictures or a number, y, of reference frames for bi-predictive pictures, where x and y have the values discussed previously. In one embodiment, the second rectangular-shaped partition is an 8×16 partition.

In step 232, the motion estimator determines whether the motion estimation performed in step 230 has caused the target complexity to be met (e.g., whether the maximum number of searches has been performed). If the motion estimator concludes in step 232 that the target complexity has been met, the motion estimator proceeds to step 240 and selects a next source macroblock for motion estimation (i.e., motion estimation for the current source macroblock is terminated).

Alternatively, if the motion estimator concludes in step 232 that the target complexity has not been met, the motion estimator proceeds to step 234 and performs motion estimation for the first rectangular-shaped partition of the source macroblock using at least one additional reference frame. For instance, if one reference frame was used for a predictive picture in step 226, at least two reference frames are used for the predictive picture in step 234. If two reference frames were used for a bi-predictive picture in step 226, at least three reference frames are used for the bi-predictive picture in step 234. In one embodiment, the motion estimation is performed in accordance with a simplified hexagon search, although other search algorithms may be used.

In step 236, the motion estimator determines whether the motion estimation performed in step 234 has caused the target complexity to be met (e.g., whether the maximum number of searches has been performed). If the motion estimator concludes in step 234 that the target complexity has been met, the motion estimator proceeds to step 240 and selects a next source macroblock for motion estimation (i.e., motion estimation for the current source macroblock is terminated).

Alternatively, if the motion estimator concludes in step 236 that the target complexity has not been met, the motion estimator proceeds to step 238 and performs motion estimation for the second rectangular-shaped partition of the source macroblock using at least one additional reference frame. For instance, if one reference frame was used for a predictive picture in step 230, at least two reference frames are used for the predictive picture in step 238. If two reference frames were used for a bi-predictive picture in step 230, at least three reference frames are used for the bi-predictive picture in step 238. In one embodiment, the motion estimation is performed in accordance with a simplified hexagon search, although other search algorithms may be used. Once motion estimation in accordance with step 238 has been completed, the motion estimator proceeds to step 240 and selects a next source macroblock for motion estimation (i.e., motion estimation for the current source macroblock is terminated).

Embodiments of the invention thereby control complexity at the partition type and reference frame level. Processing on different partitions and reference frame levels is ordered to allow complexity to be scaled from low to high. Although the above discussion refers to processing of four different partition sizes, those skilled in the art will appreciate that other and additional partition sizes, as well as reference frame levels, may be implemented for processing in accordance with the method 200.

Moreover, in further embodiments of the method 200, if the target complexity is not met by conclusion of step 238, additional motion estimation may be performed on the square-shaped partitions for increasing numbers of reference frames (e.g., (3,4), (4,5), etc.).

Figure 3:
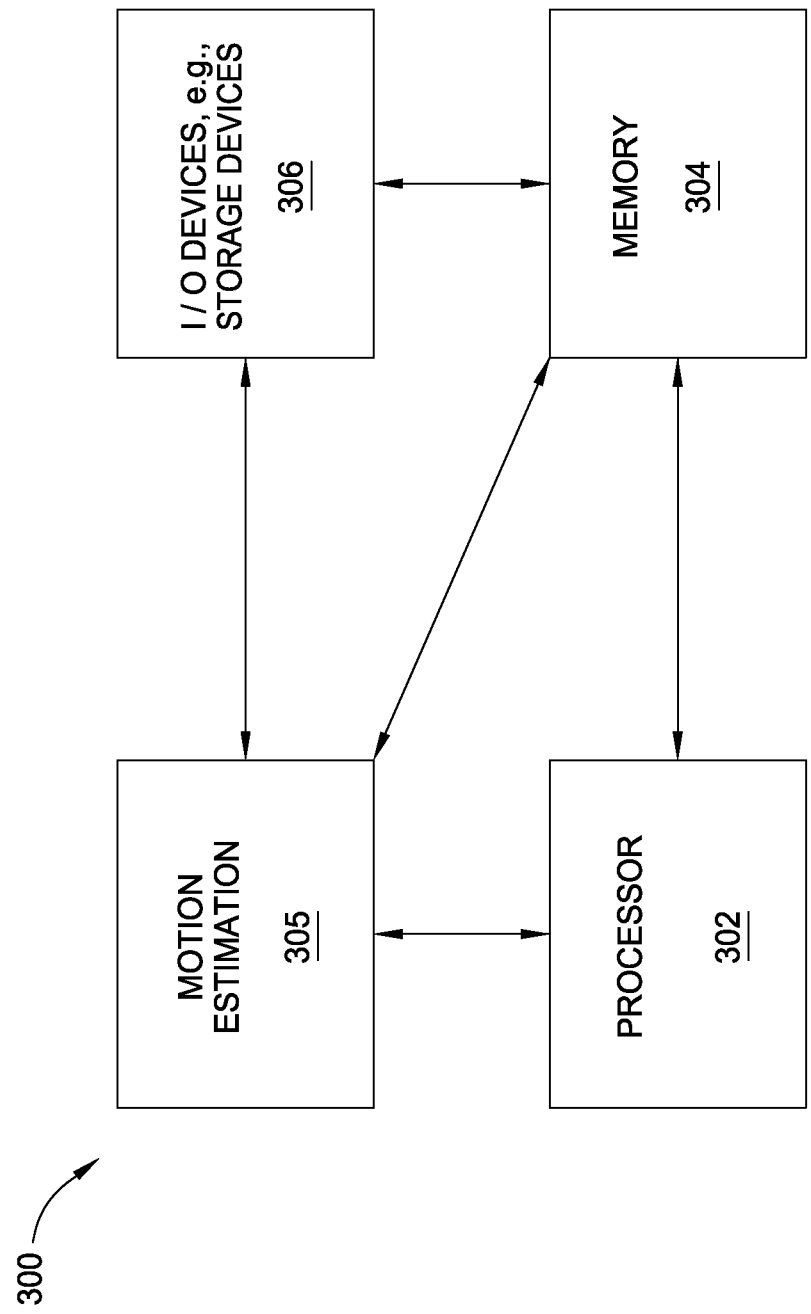
FIG. 3 is a high level block diagram of the present motion estimation method that is implemented using a general purpose computing device.

FIG. 3 is a high level block diagram of the present motion estimation method that is implemented using a general purpose computing device 300. In one embodiment, a general purpose computing device 300 comprises a processor 302, a memory 304, a motion estimation module 305 and various input/output (I/O) devices 306 such as a display, a keyboard, a mouse, a modem, a microphone, a speaker, a network connection and the like. In one embodiment, at least one I/O device is a storage device (e.g., a disk drive, flash memory, an optical disk drive, a floppy disk drive). It should be understood that the motion estimation module 305 can be implemented as a physical device or subsystem that is coupled to a processor through a communication channel.

Alternatively, the motion estimation module 305 can be represented by one or more software applications (or even a combination of software and hardware, e.g., using Application-Specific Integrated Circuits (ASIC)), where the software is loaded from a storage medium (e.g., I/O devices 606) and operated by the processor 302 in the memory 304 of the general purpose computing device 300. Additionally, the software may run in a distributed or partitioned fashion on two or more computing devices similar to the general purpose computing device 300. Thus, in one embodiment, the motion estimation module 305 for speeding up video encoder processes described herein with reference to the preceding figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Thus, the present invention represents a significant advancement in the field of video encoding. Embodiments of the invention provide a scalable approach to motion estimation in which various steps of the motion estimation process correspond to different complexities and search qualities.

While the foregoing is directed to embodiments of the invention, other and further embodiments of the invention may be devised without departing from the basic scope thereof.

What is claimed is:

1. A method for performing motion estimation in a video encoder, comprising:
at a motion estimator of the video encoder:
setting a target complexity for a macroblock of a source frame, wherein the target complexity represents a maximum number of motion estimation searches that are allowed for the macroblock; and
performing, by at least one processor or circuit, motion estimation for at least a subset of a plurality of partitions of the macroblock containing more than one type of partition, including at least one rectangular or square-shaped partition and at least one partition of a different size wherein after finishing motion estimation for a partition in the plurality of partitions of the macroblock, motion estimation for another partition in the plurality of partitions of the macroblock is performed until the target complexity is met,
wherein the motion estimation is performed using at least one reference picture for each of the at least one of the plurality of partitions of the macroblock, and
wherein the at least one reference picture comprises one or more reference pictures for a predictive picture or two or more reference pictures for a bi-predictive picture.

2. The method of claim 1, wherein the target complexity is derived from a metric based on a sum of absolute differences count for the macroblock.

3. The method of claim 1, wherein the motion estimation is performed on at least one type of the plurality of partitions that is square-shaped, while at least one other type of the plurality of partitions is not square-shaped.

4. The method of claim 3, wherein the motion estimation is performed for the plurality of partitions that are square-shaped, by types of the plurality of partitions in order of decreasing size.

5. A method for performing motion estimation in a video encoder, comprising:
at a motion estimator in the video encoder:
setting a target complexity for a macroblock of a source frame, wherein the target complexity represents a maximum number of motion estimation searches that are allowed for the macroblock; and
performing, by at least one processor or circuit, motion estimation for at least a subset of a plurality of partitions of the macroblock containing more than one type of partition, including at least one rectangular and at least one square-shaped partition wherein after finishing motion estimation for a partition in the plurality of partitions of the macroblock, motion estimation for another partition in the plurality of partitions of the macroblock is performed until the target complexity is met,
wherein the motion estimation is performed using at least one reference picture for each of the at least one of the plurality of partitions of the macroblock, and
wherein the at least one reference picture comprises one or more reference pictures for a predictive picture or two or more reference pictures for a bi-predictive picture.

6. The method of claim 5, wherein the target complexity is derived from a metric based on a sum of absolute differences count for the macroblock.

7. The method of claim 5, wherein the motion estimation is performed for the plurality of partitions that are square-shaped, by types of the plurality of partitions in order of decreasing size.

* * * * *